US011358284B2

(12) United States Patent
 Adiletta (10) Patent No.: US 11,358,284 B2
(45) Date of Patent: Jun. 14, 2022

(54) SIGNING ROBOTIC HAND ASSEMBLY APPARATUSES, SYSTEMS, AND METHODS

(71) Applicant: Jack Adiletta, Bolton, MA (US)

(72) Inventor: Jack Adiletta, Bolton, MA (US)

( * ) Notice: Subject to any disclaimer, the term of this patent is extended or adjusted under 35 U.S.C. 154(b) by 150 days.

(21) Appl. No.: 16/395,042

(22) Filed: Apr. 25, 2019

(65) Prior Publication Data
 US 2020/0338745 A1 Oct. 29, 2020

(51) Int. Cl.
 *B25J 15/10* (2006.01)
 *B25J 11/00* (2006.01)
 (Continued)

(52) U.S. Cl.
 CPC ......... *B25J 11/0005* (2013.01); *B25J 9/1664* (2013.01); *B25J 13/06* (2013.01); *B25J 15/10* (2013.01)

(58) Field of Classification Search
 CPC ........ B25J 15/0009; B25J 15/10; B25J 9/104; B25J 15/08; B25J 19/0091; B25J 9/1612; B25J 13/084; B25J 15/12; B25J 15/0233; B25J 9/0006; B25J 9/1045; B25J 9/1664; B25J 13/02; B25J 15/0206; B25J 15/0286; B25J 15/0475; B25J 15/103; B25J 19/04; B25J 9/0015; B25J 9/142; B25J 9/1689; B25J 9/1697; B25J 11/0005; B25J 13/06; B25J 13/083; B25J 13/088; B25J 15/008; B25J 15/0085; B25J 15/024; B25J 15/0266; B25J 15/0616; B25J 9/046; B25J 9/08; B25J 9/106; B25J 9/1075; B25J 9/1607; B25J 9/1694; B25J 9/1669; A61F 2/586; A61F 2/583; A61F 2002/5007; A61F 2002/5093; A61F 2002/501; A61F 2002/5018; A61F 2002/6836; A61F 2/72; A61F 5/013; A61F 2002/587; A61F 2002/704; A61F 2002/745; A61F 2002/747; A61F 2005/0155; Y10S 901/36; Y10S 901/39; Y10S 901/31; Y10S 294/907; A61H 1/0288; A61H 2201/1635; A61H 2201/165; A61H 2205/067; A61H 2201/5069; A61H 2201/0165; A61H 2201/1215; A61H 2201/149; A61H 2201/1676; A61H 2201/501; A61H 2201/5038; A61H 2201/5043; A61H 2201/5046; A61H 2201/5097; A61H 1/00; A61H 2201/1207; A61H 2201/14; A61H 2201/1647; A61H 2201/169; A61H 2201/5048; A61H 2201/5061;
 (Continued)

(56) References Cited

U.S. PATENT DOCUMENTS

| 6,244,644 B1* | 6/2001 | Lovchik | ................... | B25J 9/104 |
| | | | | 294/111 |
| 2003/0146898 A1* | 8/2003 | Kawasaki | ............ | B25J 15/0009 |
| | | | | 345/156 |

(Continued)

OTHER PUBLICATIONS

Vasalya et al., Low cost implementation of pseudo arm by poly-finger tactual interface, 2010, IEEE, p. 472-477 (Year: 2010).*
(Continued)

*Primary Examiner* — Mcdieunel Marc
(74) *Attorney, Agent, or Firm* — Fish & Richardson P.C.

(57) ABSTRACT

Intelligent robotic hand assembly systems.

26 Claims, 10 Drawing Sheets

(51) Int. Cl.
*B25J 9/16* (2006.01)
*B25J 13/06* (2006.01)

(58) Field of Classification Search
CPC .............. A61H 2201/5064; A61H 1/02; A61H 1/0237; A61H 1/0285; A61H 2201/0107; A61H 2201/1238; A61H 2201/50; A61H 2201/5058; A61H 2205/06; A61H 2205/065; A61H 2205/086; A61H 2205/088; A61H 2205/102; A61H 2230/605; G05B 2219/40132; G05B 2219/37131; G05B 2219/37319; G05B 2219/39369; G05B 2219/39484; G05B 2219/39492; G05B 2219/39527; G05B 2219/39528; G05B 2219/39531; G05B 2219/39532; G05B 2219/39556; G05B 2219/40032; G05B 2219/40053; G05B 2219/40392; G05B 2219/40536; G05B 2219/40613; G05B 2219/45105; G05B 2219/39505; G05B 2219/39543; G05B 2219/40564; G01L 5/228
See application file for complete search history.

(56) References Cited

U.S. PATENT DOCUMENTS

| | | | |
|---|---|---|---|
| 2009/0015026 A1* | 1/2009 | Matsuda | B25J 15/0009 294/106 |
| 2010/0259057 A1* | 10/2010 | Madhani | B25J 15/0009 294/106 |
| 2010/0292842 A1* | 11/2010 | Takahashi | B25J 9/1612 700/262 |
| 2013/0278500 A1* | 10/2013 | Kawasaki | B25J 13/02 345/156 |
| 2015/0298319 A1* | 10/2015 | Guo | B25J 15/0009 74/490.06 |

OTHER PUBLICATIONS

Rasakatla et al., RAMA-1 highly dexterous 48DOF robotic hand using magnetic spherical joints, 2014, IEEE, p. (Year: 2014).*
Jung et al., Design of biomimetic hand prosthesis with tendon-driven five fingers, 2008, IEEE, p. 895-900 (Year: 2008).*
Bridgwater et al., The Robonaut 2 hand-designed to do work with tools, IEEE, p. 2012, p. 3425-3430 (Year: 2012).*
Akalin et al., Humanoid Robots Communication with Participants Using Sign Language: An Interaction Based Sign Language Game, 2013, IEEE, p. 181-186 (Year: 2013).*
Crawford et al., "Design of a robotic hand with a biologically-inspired parallel actuation system for prosthetic applications," International Design Engineering Technical Conferences and Computers and Information in Engineering Conference, Jan. 1, 2010, 44106:29-36.
Lotti et al., "Ubh 3: A biologically inspired robotic hand," IEEE Int. Conf. on Intelligent Manipulation and Grasping, Jul. 2004, 7 pages.

* cited by examiner

SIGNING ROBOTIC HAND ASSEMBLY APPARATUSES, SYSTEMS, AND METHODS

TECHNICAL FIELD

The present application relates generally to the field of robotic systems.

BACKGROUND

Events such as natural disasters highlight the importance of being prepared to quickly deploy a wide range of communication protocols that cross a breadth of languages. For example, during and in the aftermath of a disaster, such as a hurricane, public officials may host press conferences informing the public about dangers, safe areas, and safety protocols that are underway. Because of the sporadic, unpredictable, and untimely nature of these event, such emergency press conferences may not always be prepared or equipped to communicate with certain portions of the population, such as the hearing impaired. As such, communications at such events may be mistranslated or not translated at all, which can be catastrophic or fatal for those who communicate through alternative languages, such as sign languages.

SUMMARY

The inventor has appreciated that various embodiments disclosed herein provide apparatuses, systems, and methods for effectively and precisely communicating sign language(s) translated from spoken words through the use of a robotic hand assembly. The inventor also appreciated that to perform sign languages, such as the American Sign Language (ASL), correctly, the robotic hand assembly had to be analogous to the human hand in dexterity and flexion.

Various embodiments provide a robotic hand assembly. The robotic hand assembly includes a base palm portion. The robotic hand assembly includes a plurality of fingers coupled to the base palm portion. Each of the plurality of fingers is configured to rotate and pivot about a plurality of joint points. The plurality of fingers include a respective ball joint positioned at each joint point. The plurality of fingers include a plurality of tensile members coupled to one or more of the plurality of fingers. The robotic hand assembly includes a plurality of servomotors coupled to the plurality of tensile members. The at least one servomotor is configured to selectively and collectively actuate one or more tensile members in the plurality of tensile members into an extension or flexion. The robotic hand assembly includes a controller communicably coupled to the plurality of servomotors. The controller configured to selectively and collectively actuate one or more of the servo motors to actuate one or more tensile members and thereby cause the robotic hand to gesture or sign a specified letter or word selected from a plurality of words or letters corresponding to a sign language by repositioning one or more of the base palm portion and at least one of the plurality of fingers.

In some implementations, the respective ball joints include a mono-oriented ball engaged in a mono-oriented socket.

In certain implementations, the mono-oriented socket includes a positive stop.

In particular implementations, the robotic hand assembly includes a plurality of servo motors are positioned on the base palm portion.

In some implementations, the robotic hand assembly includes a counter tensioning spring.

In certain implementations, the plurality of servo motors are positioned on the base palm portion in a servomotor holster recessed within the base palm portion.

In particular implementations, the robotic hand assembly includes a stand portion, the base palm portion coupled to the stand portion.

In some implementations, the base palm portion is configured to rotate about at least one axis with respect to the stand portion.

In certain implementations, the base palm portion is configured to rotate about at least two axis with respect to the stand portion.

In particular implementations, the base palm portion is configured to rotate about 3 orthogonal axes with respect to the stand portion.

In some implementations, the robotic hand assembly includes a plurality of elastic members extending across one or more joint points and linking one segment of a finger in the plurality of fingers to another segment of the finger.

In certain implementations, the plurality of tensile members include inelastic strands.

In particular implementations, segments of a finger comprise guide tracks for one or more tensile members in the plurality of tensile members.

In some implementations, segments of a finger comprise a positive stop for limiting motion of a finger segment.

In certain implementations, fingers in the plurality of fingers comprises three ball joints and three joint points.

In particular implementations, the controller comprises a memory storing positions of the base palm portion and each finger in the plurality of fingers with respect to the stand portion. The positions correspond to a plurality of signs and words in the sign language.

Various embodiments provide methods of signing with a robotic hand assembly. The methods include receiving an input corresponding to one or more words for translation. The methods include determining a position of one or more fingers of a plurality of fingers coupled to a base palm portion corresponding to the input. Each of the plurality of fingers is configured to rotate and pivot about a plurality of joint points. The plurality of fingers include a respective ball joint positioned at each joint point. The plurality of fingers include a plurality of tensile members coupled to one or more of the plurality of fingers. The methods include actuating one or more fingers of the plurality of fingers via a plurality of servomotors coupled to the plurality of tensile members to reposition one or more of the fingers in the plurality of fingers to a position and orientation corresponding to a sign corresponding to the input.

In some implementations, receiving includes receiving the input via a graphical user interface.

In certain implementations, receiving includes receiving the input via a microphone.

In particular implementations, the methods include repositioning a stand portion of the robotic hand assembly responsive to one or more motions of a speaker detected via at least one of a camera and a radar.

Various embodiments provide computer program products including a non-transitory computer-readable storage device, storing computer executable instructions, which computer executable instruction, if executed by a data processing system communicably coupled to a robotic hand assembly, cause the robotic hand assembly to: determine a position and or orientation for one or more fingers of a plurality of fingers coupled to a base palm portion to correspond to a word input and actuate the one or more fingers of the plurality of fingers via a plurality of servomotors coupled to the plurality of tensile members to reposition one or more of the fingers in the plurality of fingers to the position or orientation corresponding to a sign corresponding to the input.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive subject matter disclosed herein will become more apparent from the detailed description set forth below when taken in conjunction with the drawings.

DETAILED DESCRIPTION

Following below are more detailed descriptions of various concepts related to, and exemplary embodiments of, inventive systems, methods and components of robotic hand assemblies.

Figure 1A:
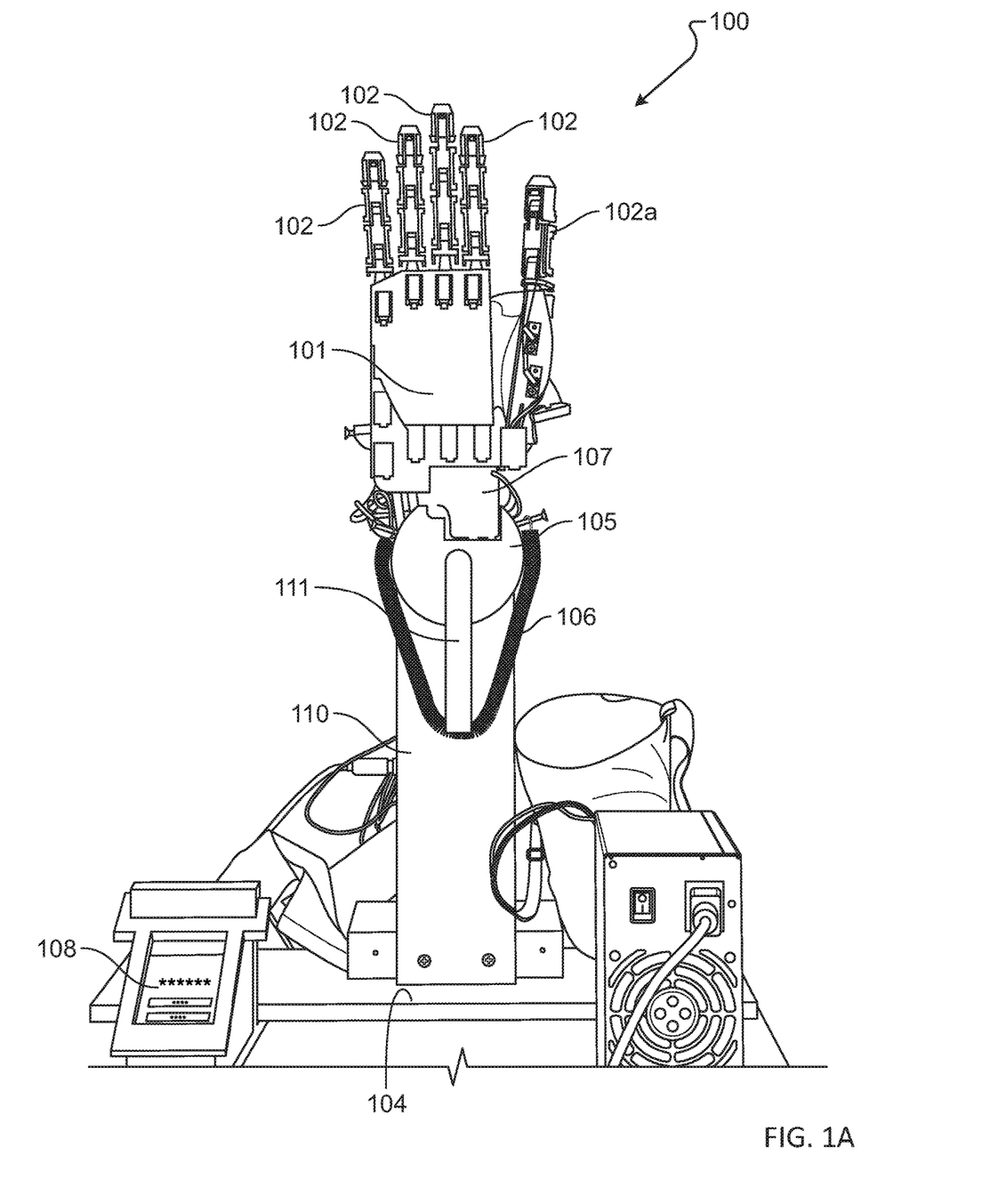
FIG. 1A is a bottom view of a robotic hand assembly.

FIG. 1A is a bottom view of a robotic hand assembly. Robotic hand assembly 100 includes a plurality of fingers 102 and 102a. As discussed in further detail herein, these fingers 102 and 102a are specially configured to have dexterity and flexion akin to the human hand. The robotic hand assembly 100 includes a base palm portion 101 to which fingers 102 and 102a are moveably connected. As discussed in further detail herein, the fingers 102 and 102a are configured for actuation for signing. The base palm portion 101 is connected to a hand-stand or pedestal 104 including an elevation pedestal 110. In particular implementations, the pedestal 104 can be a mobile pedestal and the elevation pedestal 110 can be telescopic. For example, the pedestal 104 can be equipped with wheels and/or a motor for mobility and the telescopic pedestal can be configured to place the robotic hand assembly 100 at the height of a speaker, for example from a floor surface, stage on which the speaker is speaking, or table top. The pedestal 104 can be robotic, so as to move (e.g. drive, roll, or otherwise translate) or adjust along with a user as the user is speaking and can be programmed with intuitive and adaptive controls to adjust to the height and position of a speaker for which the hand is translating so as to be in the scope or view of a camera recording the speaker at e.g., a press conference. The robotic controls may comprise one or more proximity sensors or imaging sensors, such as a radar or camera, for detecting the position of a speaker for whom the robotic hand assembly 100 is translated As discussed in further detail herein, in particular implementations, the robotic hand assembly 100 may include a microphone to record the words of a speaker, which words can be processed and translated to determine the signage for the robotic hand assembly to convey.

The base palm portion 101 is connected to the elevation pedestal 110 by a plurality of components that allow the robotic hand assembly 100 to rotate about a plurality of axis. The base palm portion 101 is connected to the elevation pedestal 110 by lateral rotary disc 105. The lateral rotary disc 105 includes a tension arm 111 and a counter tension spring 106a and 106b connected to the tension spring.

The lateral rotary disc 105 allows the base palm portion 101 to rotate laterally with respect to the elevation pedestal 110. The tension arm 111 rotates with the base palm portion 101 during any such lateral rotations. The counter tension springs 106a and 106b provide a counterforce during such rotations depending respectively on which direction the palm portion 101 rotates. For example, if the base palm portion 101 rotates laterally clockwise (i.e. about pivot point 112), the counter tension spring 106a will apply a counter tension in the counter clockwise direction (while the counter tension spring 106b will have additional slack). The counter tension provides a counter force to put less strain on the rotary actuator rotating the hand for restoring the base palm portion 101 to its upright position when needed.

The robotic hand assembly 100 includes a graphical user interface (GUI) 108 configured to receive user inputs through tactile input. In particular implementations, the graphical user interface 108 includes one or more sensors, such as a microphone or camera, for obtaining user input. The display may be used for interaction and mode selection. For example, the GUI 108 may be configured to allow a user to select a particular sign language such as American Sign Language. Additionally, the GUI 108 may be configured to allow a user to select or adjust a signing speed or to select a mode such as a record mode for listening and translating.

Figure 1B:
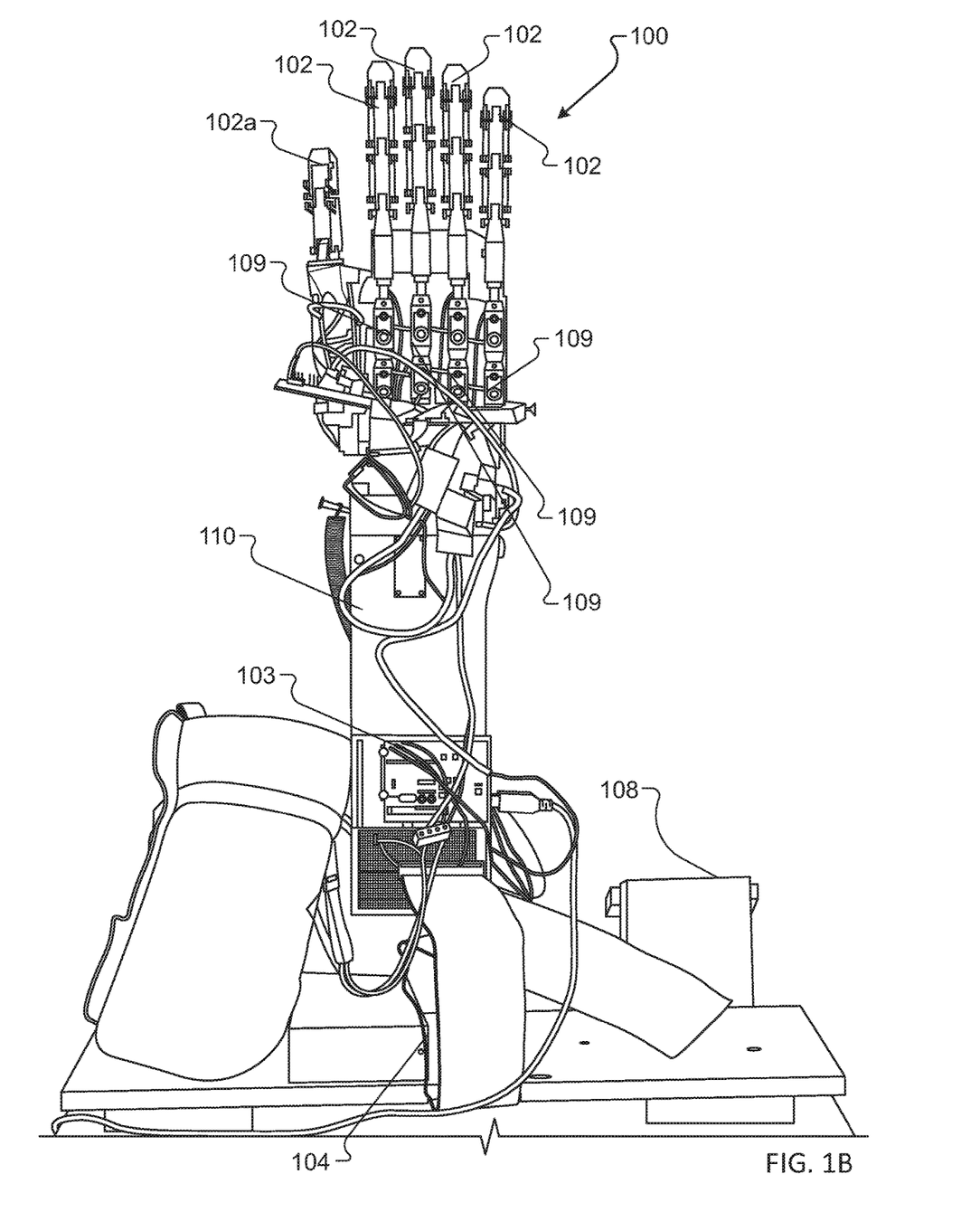
FIG. 1B is a top view of the robotic hand assembly of FIG. 1A.

FIG. 1B is a top view of the robotic hand assembly of FIG. 1A. One or more processors '112 is visible in FIG. 1B. The graphical user interface 108 is communicably coupled with one or more processors 103 for analyzing the input received via the graphical user interface 108 and/or associated sensors and determining the type and kind of articulation and flexion for each of the respective fingers is warranted to produce the corresponding sign language. For example, the one or more processors 103 include one or more memory storage components programed with a position and orientation of each finger 102 and 102a and the palm portion 101. Accordingly, in response to translation of an input obtained via the graphical user interface 108, the hand 201 is repositioned sequentially in response to translation of the input a sign language, such as the American Sign Language.

Figure 2A:
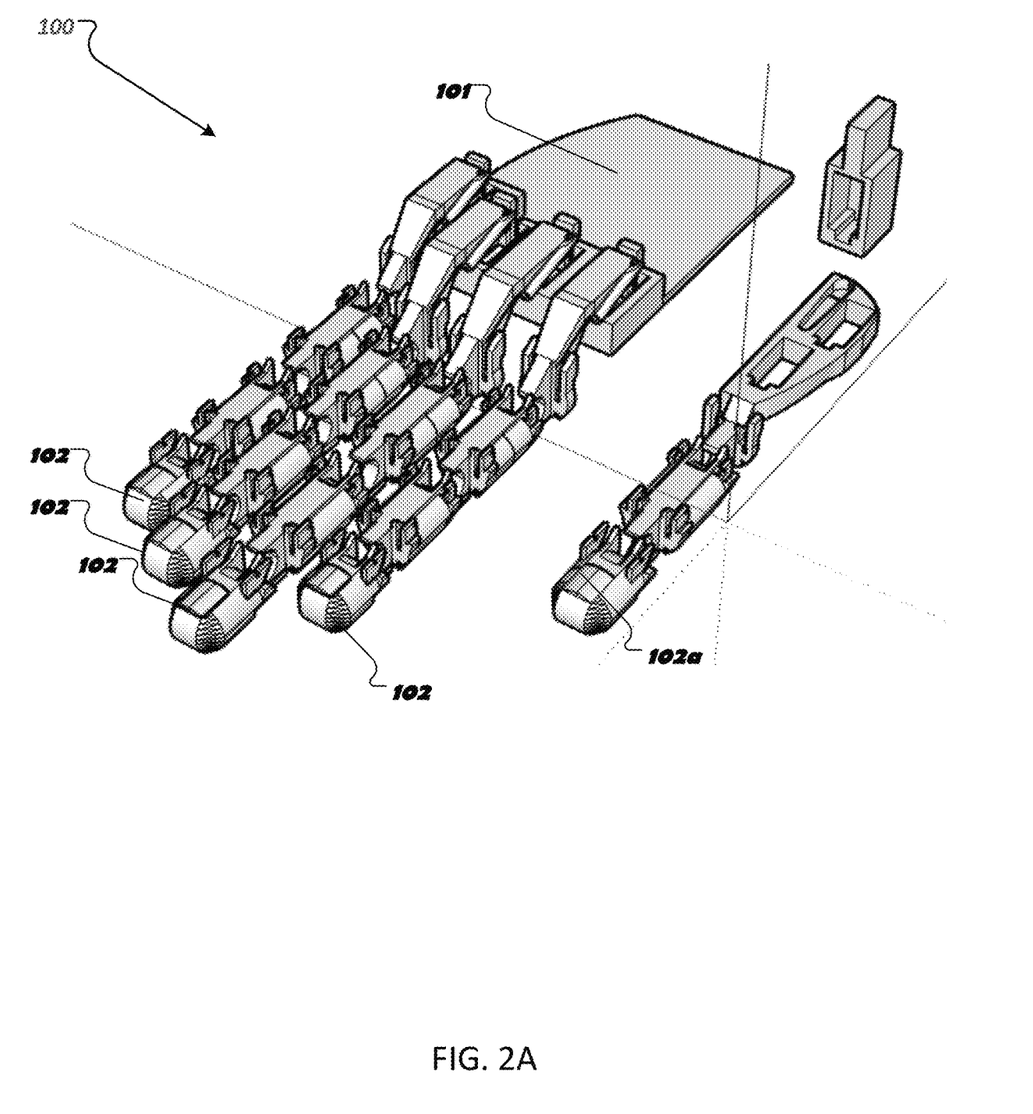
FIG. 2A shows a perspective, partially exploded view of hand portion of the robotic hand assembly of FIG. 1A.
Figure 2B:
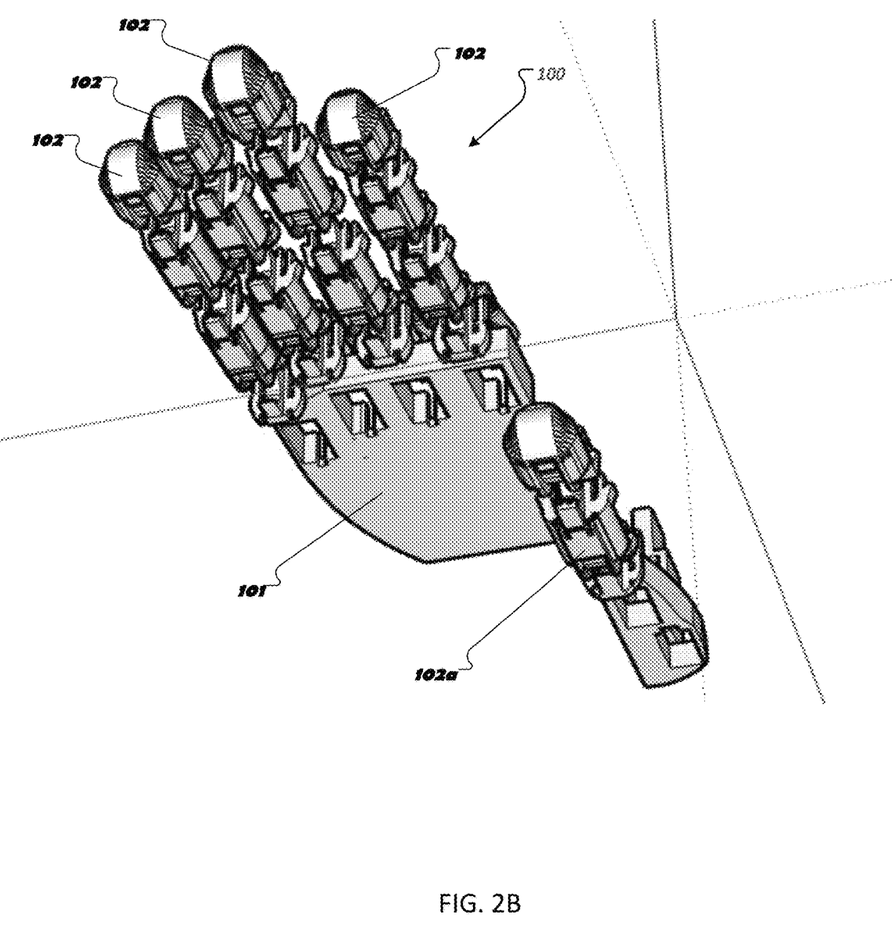
FIG. 2B shows an alternative perspective view of hand portion of the robotic hand assembly of FIG. 1A.

FIG. 2A shows a perspective, partially exploded view of the hand portion of the robotic hand assembly of FIG. 1A. FIG. 2B shows an alternative perspective view of hand portion of the robotic hand assembly of FIG. 1A. In particular, the hand portion comprises four of the fingers 102 and a thumb 102a. The four fingers 102 are coupled to the palm portion 101 via knuckles 201. As discussed in further detail herein, in addition to the knuckles 201 movably connecting the fingers 102 to the palm portion 101, the knuckles 201 house and/or transition components extending from the palm portion 101. The fingers 102 are provided with varying lengths and can all be actuated independently and synchronously with or without the palm portion 101 depending on the sign. In particular implementations, the fingers 102 and 102a can be equipped with one or more position sensors, accelerometers, and/or tilt sensors for feedback control to the one or more processors controlling actuation of the fingers.

Figures 3A, 3B:
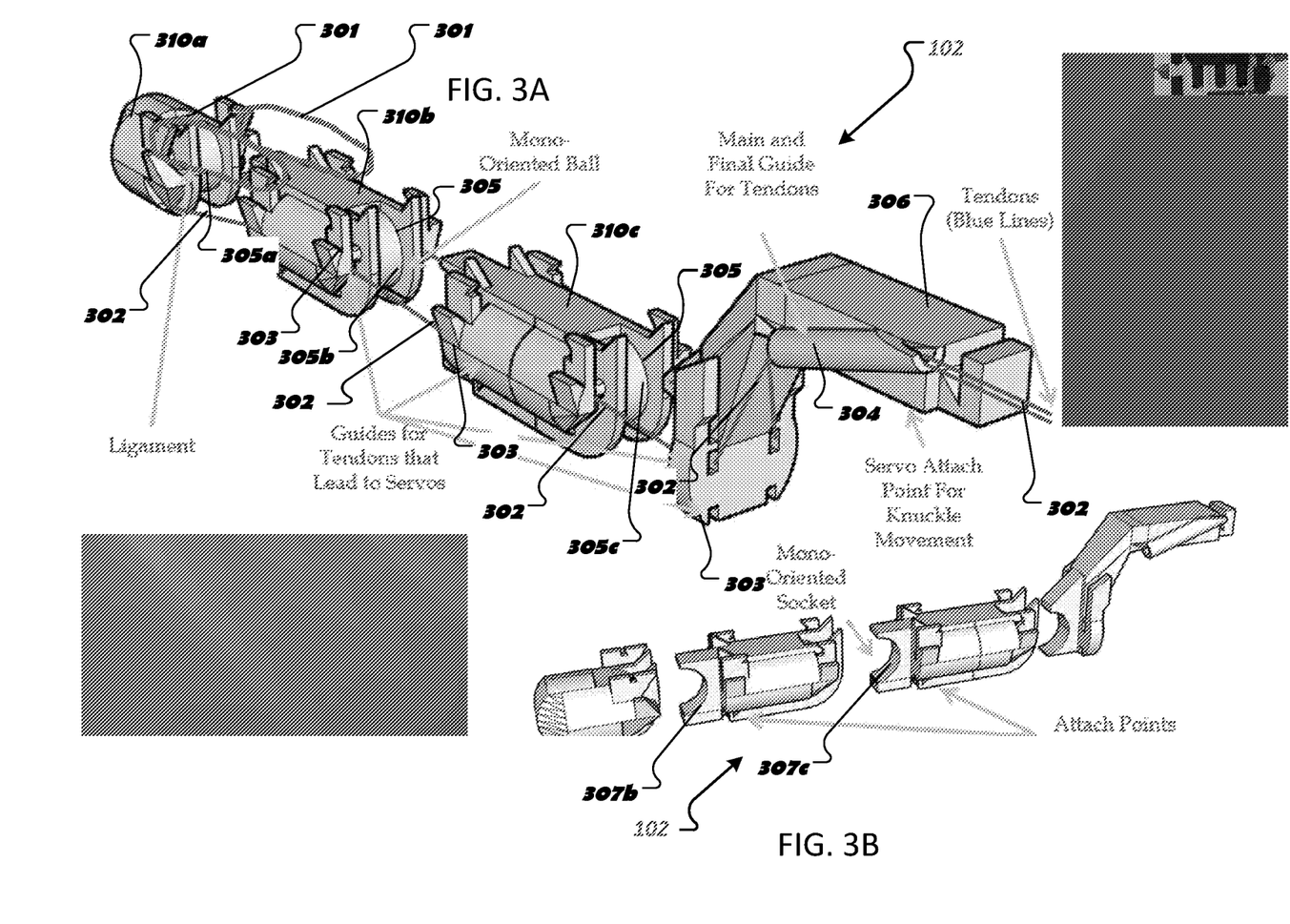
FIGS. 3A-3C illustrate detailed views of a finger portion of the robotic hand assembly of FIG. 1A.
Figure 3C:
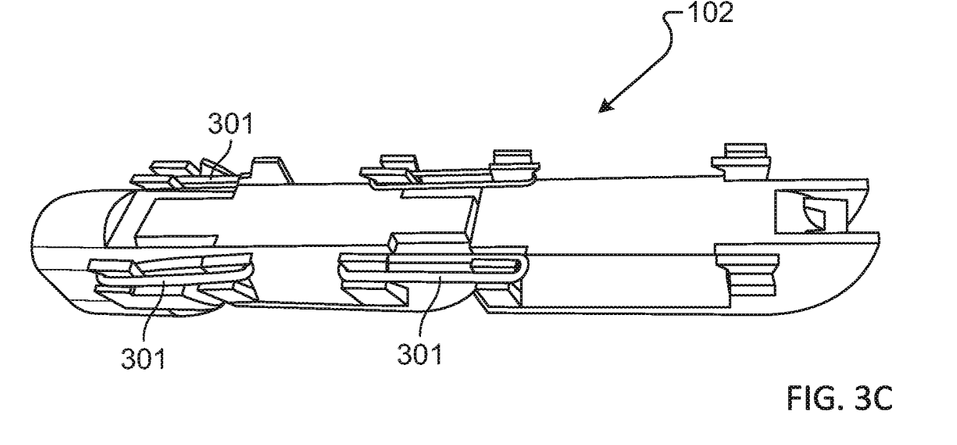

FIGS. 3A-3C illustrate detailed views of a finger portion of the robotic hand assembly of FIG. 1A. The fingers 102 include a plurality of phalange sections 310a, 310b, and 310c corresponding to phalanges of the hand. The phalange sections include a mono-oriented ball section and/or a socket section, which facilitate and limit rotation of the sections. For example, the phalange section 310a includes a mono-oriented ball section 305a, and the phalange section 310b includes a mono-oriented ball section 305b at a first end and a socket section 307b at a second end. The socket section 307b is configured to engage the mono-oriented ball section 305a, while the mono-oriented ball section 305b is configured to engage the socket section 307c of the phalange section 310c. The phalange sections 310a-310c are coupled to one another via a plurality of elastic ligament components 301. As shown in FIGS. 3A-3C the elastic ligament components 301 can be configured as a loop element and secured into notches in the respective phalange sections. The elastic ligament components 301 help the phalange sections 310a-310c retract to their erect position with respect to one another after the force for bending to form a sign is subsequently released. The 180 degree mono-oriented socket sections 307c allow for a controlled range of up and down movement, while the parallel ligaments 301 prevent up and down dislocation. The phalange sections also include a plurality of guides 303 configured to receive tendon strands 302 extending from the hands. The tendon strands 302 are coupled to servomotors as discussed further herein, which are configured to actuate the fingers 102 and thumb 102a responsive to input via the user interface 108. The knuckle 306 includes a main and final guide 304 for the tendon strands 302. As illustrated in FIG. 3A, each of the fingers 102 or 102a includes two tendon strands 302 for actuating the phalanges 302a-302c of the fingers 102, 102a.

Figure 4A:
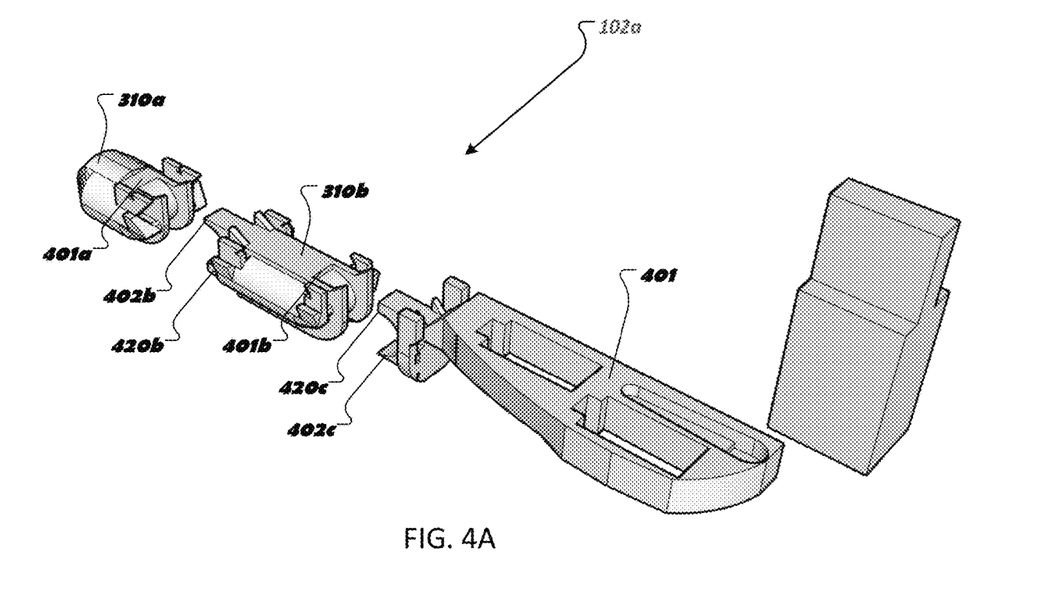
FIGS. 4A-4B show exploded views of a finger portion of the robotic hand assembly of FIG. 1A.
Figure 4B:
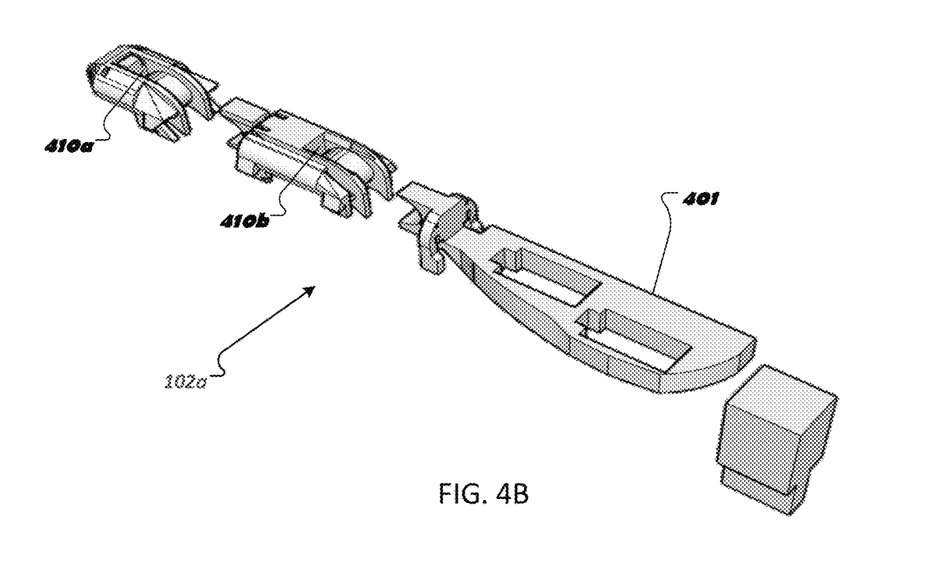

FIGS. 4A-4B show exploded views of a finger portion of the robotic hand assembly of FIG. 1A. As shown in detail in FIGS. 4A and 4B, the phalange sections 310a-310b include a plurality of stops 401a, 401b, 410a and 410b configured to engage bump stops 402b, 420b, 402c, and 420c for assisting with limiting the rotation of the phalanges 302a-302c in the mono-oriented socket sections 307c.

Figures 5A, 5B:
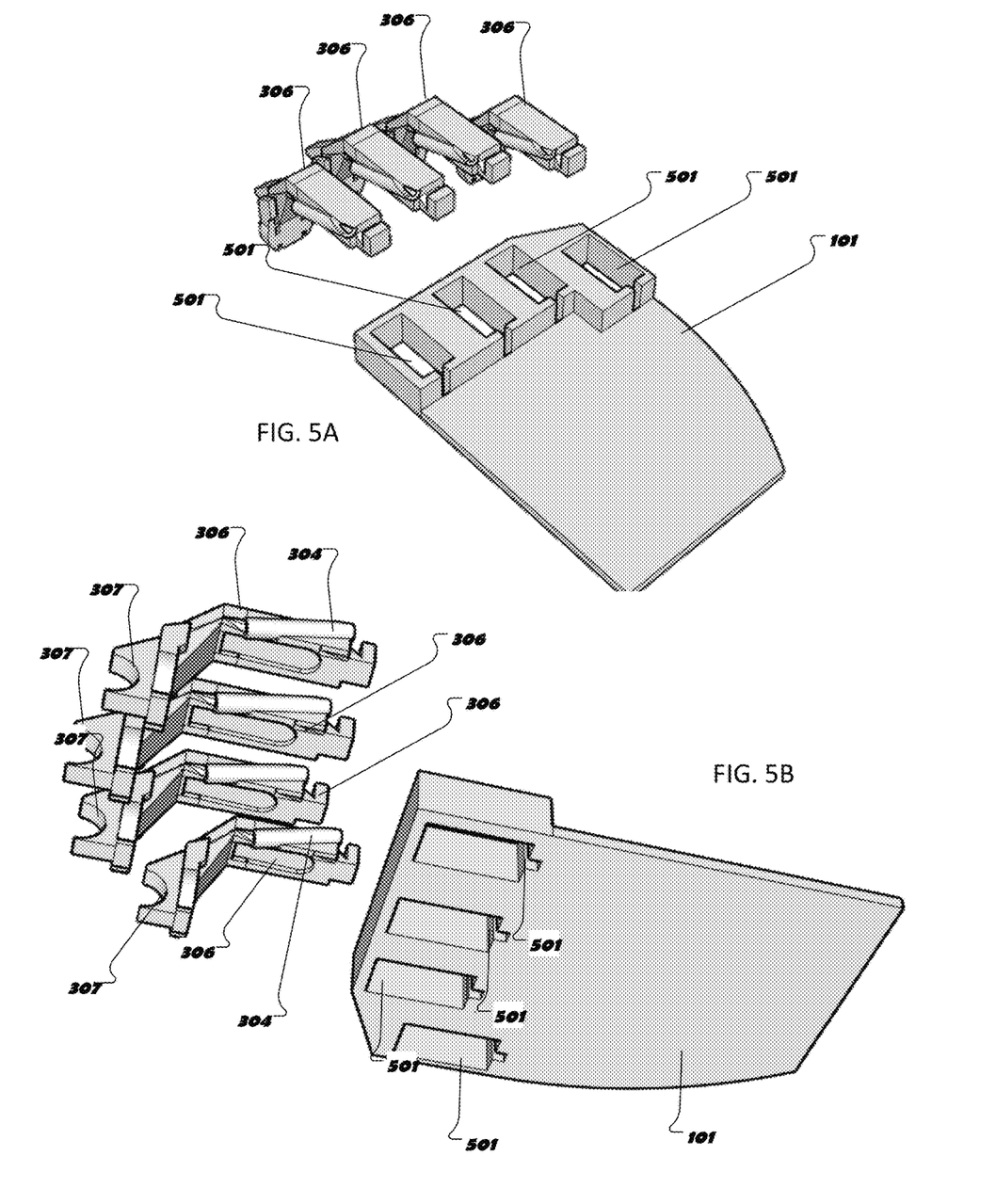
FIGS. 5A-5B show exploded views of a base palm portion of the robotic hand assembly of FIG. 1A.

FIGS. 5A-5B show exploded views of a base palm portion of the robotic hand assembly of FIG. 1A. The base palm portion 101 includes a plurality of servo motor holsters 501. The servomotors positioned in the servo motor holsters are connected to the tendon strands 302 and are independently controllable for actuating the respective finger.

Figure 6:
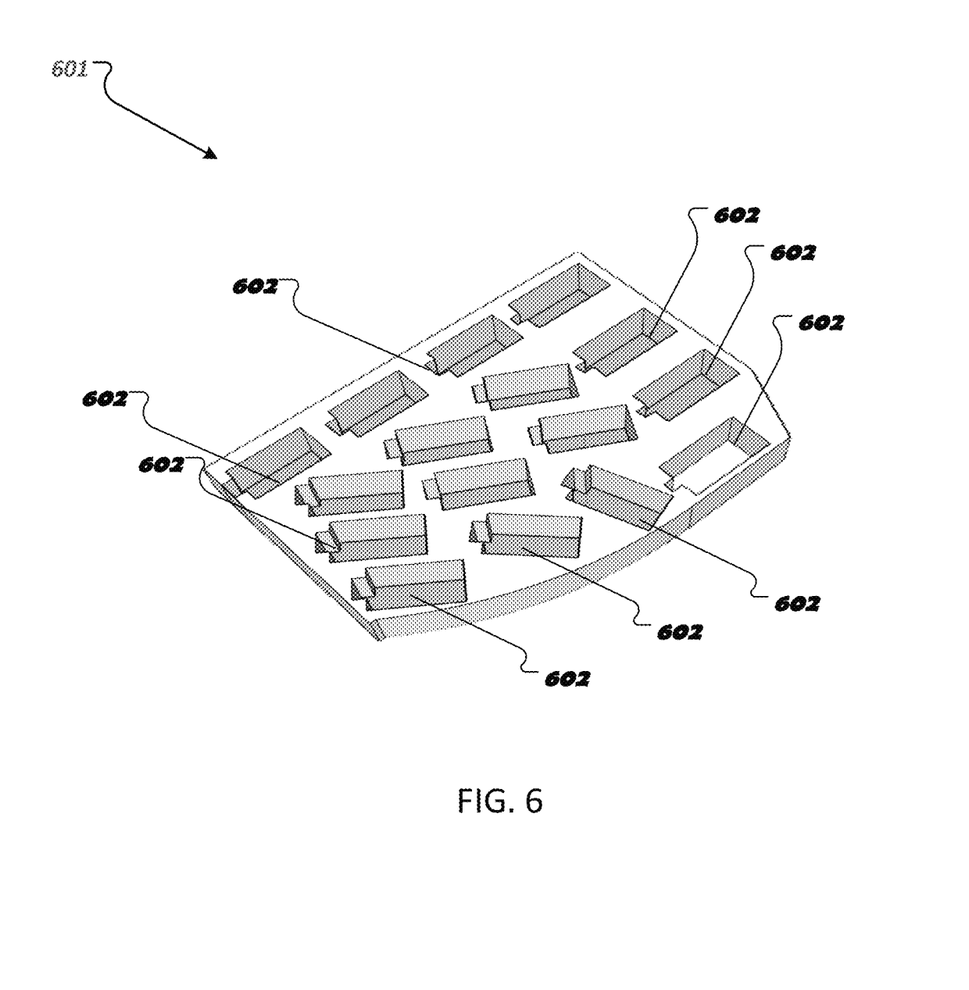
FIG. 6 shows an alternative base palm portion for a robotic hand assembly.

FIG. 6 shows an alternative base palm portion for a robotic hand assembly. As demonstrated in FIG. 6, particular implementations can include a plurality of servomotors for each finger, which can be positioned in a plurality of servo motor holsters 602 positioned at various locations in the base palm portion 601.

Figure 7:
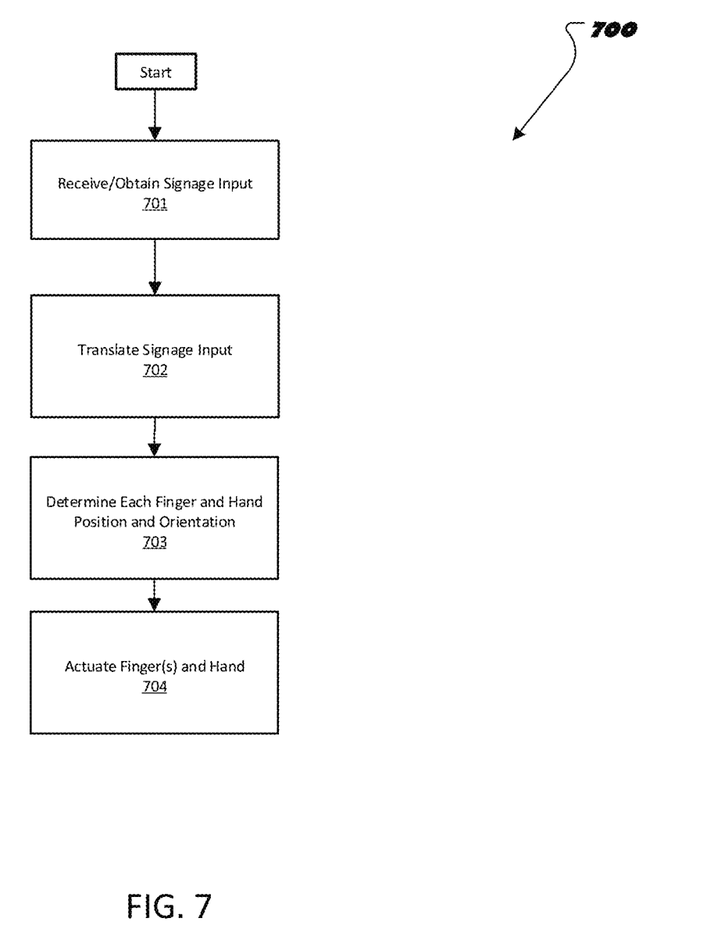
FIG. 7 schematically illustrates a block diagram of a processes run by a controller of a robotic hand assembly.

FIG. 7 schematically illustrates a block diagram of processes 700 run by a controller of a robotic hand assembly. In a first process 701, the robotic hand assembly receives a signage input. The receipt of the signage input may be via a microphone or other sensor, via a keypad, or other system for obtaining the input words or language. The process 701 can be facilitated, for example via the GUI 108 or via one or more other sensors or input devices. In process 702, the processor(s) 103 translates the typed or spoken language inputs into corresponding signs. In process 703, the processor(s) determine the appropriate finger and hand positions for the fingers corresponding to the associated signs. In process 704, the processor(s) provide inputs for the servomotors to move the tendon strands 302 to reposition the fingers and/or to the motor to reposition or re-orient the hand.

In some implementations, the robotic hand assembly can be programmed via digital or analog inputs for finger and hand positions. In some implementations, the robotic hand assembly 100 can be configured for physical program. In such implementations, a user can physically orient the hand or fingers to a particular position and the user can use the GUI 108 to record the position and provide an input as to what word with which that position corresponds. Accordingly, the robotic hand assembly can be programmed for different languages and deployed when electronic data is unavailable. The robotic hand assembly can then use the microphone sensor or keypad to recall the hand and finger position and orientation when the word is heard or typed input into the GUI. This feature also can be used to facilitate checking and or adjusting preprogrammed hand positions.

Implementations of the subject matter and the operations described in this specification can be implemented by digital electronic circuitry, or via computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary implementations, and that such variations are intended to be encompassed by the present disclosure. It is recognized that features of the disclosed implementations can be incorporated into other disclosed implementations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A robotic hand assembly comprising:
    a base palm portion;
    a plurality of fingers coupled to the base palm portion, each of the plurality of fingers configured to rotate and pivot about a plurality of joint points, the plurality of fingers comprising a respective ball joint positioned at each joint point, the plurality of fingers comprising a plurality of tensile members coupled to one or more of the plurality of fingers;
    a plurality of servo motors coupled to the plurality of tensile members, the at least one servo motor configured to selectively and collectively actuate one or more tensile members in the plurality of tensile members into an extension or flexion; and
    a controller communicably coupled to the plurality of servo motors, the controller configured to selectively and collectively actuate one or more of the servo motors to actuate one or more tensile members and thereby cause the robotic hand to gesture or sign a specified letter or word selected from a plurality of words or letters corresponding to a sign language by repositioning one or more of the base palm portion and at least one of the plurality of fingers;
    wherein the respective ball joints comprise a mono-oriented ball engaged in a mono-oriented socket.

2. The assembly according to claim 1, wherein the plurality of mono-oriented sockets comprise positive stops.

3. The assembly according to claim 1, wherein the plurality of servo motors are positioned on the base palm portion.

4. The assembly according to claim 1, further comprising a counter tensioning spring.

5. The assembly according to claim 1, wherein the plurality of servo motors are positioned on the base palm portion in servomotor holsters recessed within the base palm portion.

6. The assembly according to claim 1, further comprising a stand portion, the base palm portion coupled to the stand portion.

7. The assembly according to claim 6, wherein the base palm portion is configured to rotate about at least one axis with respect to the stand portion.

8. The assembly according to claim 6, wherein the base palm portion is configured to rotate about at least two axis with respect to the stand portion.

9. The assembly according to claim 6, wherein the base palm portion is configured to rotate about 3 orthogonal axes with respect to the stand portion.

10. The assembly according to claim 6, wherein the controller comprises a memory storing positions of the base palm portion and each finger in the plurality of fingers with respect to the stand portion corresponding to a plurality of signs and words in the sign language.

11. The method according to claim 10, wherein receiving comprises receiving the input via a graphical user interface.

12. The method according to claim 10, wherein receiving comprises receiving the input via a microphone.

13. The assembly according to claim 1, further comprising a plurality of elastic members extending across one or more joint points and linking one segment of a finger in the plurality of fingers to another segment of the finger.

14. The assembly according to claim 13, wherein the plurality of tensile members comprise inelastic strands.

15. The assembly according to claim 13, wherein segments of a finger comprise guide tracks for one or more tensile members in the plurality of tensile members.

16. The assembly according to claim 1, wherein segments of a finger comprise a positive stop for limiting motion of a finger segment.

17. The assembly according to claim 1, wherein fingers in the plurality of fingers comprises three ball joints and three joint points.

18. A method of signing with a robotic hand assembly comprising:
    receiving an input corresponding to one or more words for translation;

determining a position of one or more fingers of a plurality of fingers coupled to a base palm portion corresponding to the input, each of the plurality of fingers configured to rotate and pivot about a plurality of joint points, the plurality of fingers comprising a respective ball joint positioned at each joint point, the plurality of fingers comprising a plurality of tensile members coupled to one or more of the plurality of fingers;

actuating one or more fingers of the plurality of fingers via a plurality of servomotors coupled to the plurality of tensile members to reposition one or more of the fingers in the plurality of fingers to a position and orientation corresponding to a sign corresponding to the input; and repositioning a stand portion of the robotic hand assembly responsive to one or more motions of a speaker detected via at least one of a camera and a radar.

19. A computer program product comprising a non-transitory computer-readable storage device, storing computer executable instructions, which computer executable instruction, if executed by a data processing system communicably coupled to a robotic hand assembly, cause the robotic hand assembly to:

determine, based on the information retrieved from a memory storing positions of a base palm portion and each finger in a plurality of fingers with respect to a stand portion of the robotic hand assembly corresponding to a plurality of signs and words in a sign language, a position and or orientation for one or more fingers of a plurality of fingers coupled to a base palm portion to correspond to a word input, each of the plurality of fingers configured to rotate and pivot about a plurality of joint points, the plurality of fingers comprising a respective ball joint positioned at each joint point, the plurality of fingers comprising a plurality of tensile members coupled to one or more of the plurality of fingers; and actuate the one or more fingers of the plurality of fingers via a plurality of servomotors coupled to the plurality of tensile members to reposition one or more of the fingers in the plurality of fingers to the position or orientation corresponding to a sign corresponding to the input.

20. A robotic hand assembly comprising:
a base palm portion;
a plurality of fingers coupled to the base palm portion, each of the plurality of fingers configured to rotate and pivot about a plurality of joint points, the plurality of fingers comprising a respective ball joint positioned at each joint point, the plurality of fingers comprising a plurality of tensile members coupled to one or more of the plurality of fingers;
a plurality of servo motors coupled to the plurality of tensile members, the at least one servo motor configured to selectively and collectively actuate one or more tensile members in the plurality of tensile members into an extension or flexion, wherein the plurality of servo motors are positioned on the base palm portion; and
a controller communicably coupled to the plurality of servo motors, the controller configured to selectively and collectively actuate one or more of the servo motors to actuate one or more tensile members.

21. The robotic hand assembly of claim 20 in which the plurality of servo motors are positioned on the base palm portion in servomotor holsters recessed within the base palm portion.

22. A system comprising:
a robotic hand assembly comprising:
a telescopic stand portion;
a base palm portion coupled to the telescopic stand portion;
a plurality of fingers coupled to the base palm portion;
a plurality of servo motors configured to control movement of the plurality of fingers; and
a controller communicably coupled to the plurality of servo motors, in which the controller is configured to selectively and collectively actuate one or more of the servo motors to cause the robotic hand to gesture or sign a specified letter or word selected from a plurality of words or letters corresponding to a sign language;
wherein the controller is configured to control the telescopic stand portion to adjust a height of the base palm portion and the plurality of fingers to a height of a speaker for which the hand is translating so as to be in a view of a camera recording the speaker.

23. The system of claim 22 in which the robotic hand assembly comprises a mobile pedestal, the telescopic stand portion is coupled to the mobile pedestal, the controller is configured to control the mobile pedestal to move along with the speaker so as to be in the view of the camera recording the speaker.

24. A system comprising:
a robotic hand assembly comprising:
a base palm portion;
a plurality of fingers coupled to the base palm portion, each of the plurality of fingers configured to rotate and pivot about a plurality of joint points, the plurality of fingers comprising a respective ball joint positioned at each joint point, the plurality of fingers comprising a plurality of tensile members coupled to one or more of the plurality of fingers;
a plurality of elastic members extending across one or more joint points, each elastic member linking one segment of a finger in the plurality of fingers to another segment of the finger;
a plurality of servo motors coupled to the plurality of tensile members, the servo motors configured to selectively and collectively actuate one or more tensile members in the plurality of tensile members into an extension or flexion; and
a controller communicably coupled to the plurality of servo motors, the controller configured to selectively and collectively actuate one or more of the servo motors to actuate one or more tensile members.

25. The system of claim 24 in which each of the elastic members is configured as a loop element and secured into notches in the respective finger segments.

26. The system of claim 24 in which the elastic members assist the finger segments to move to an extension position after a force for bending the finger segments to form a sign is released.

* * * * *